United States Patent [19]
Weddle

[11] Patent Number: 6,059,201
[45] Date of Patent: May 9, 2000

[54] BOOM ARM SEGMENT RELEASE MECHANISM FOR A CROP SPRAYER

[75] Inventor: Kenneth E. Weddle, Trafalgar, Ind.

[73] Assignee: Equipment Technologies, LLC, Indianapolis, Ind.

[21] Appl. No.: 09/123,954

[22] Filed: Jul. 29, 1998

[51] Int. Cl.[7] ..................................................... B05B 1/20
[52] U.S. Cl. .......................... 239/164; 239/159; 239/161; 239/165; 239/166; 239/167; 239/168; 239/172; 239/176
[58] Field of Search .................................... 239/146, 159, 239/161, 163, 164, 165, 166, 167, 168, 172, 176

[56] References Cited

U.S. PATENT DOCUMENTS

| | | |
|---|---|---|
| 1,470,246 | 10/1923 | Willis et al. . |
| 2,541,417 | 2/1951 | Hartsock ................................ 239/168 |
| 2,564,041 | 8/1951 | Vogel, Jr. . |
| 3,147,925 | 9/1964 | Compton et al. . |
| 3,236,456 | 2/1966 | Ackley et al. ........................... 239/168 |
| 3,556,404 | 1/1971 | Walker . |
| 4,288,034 | 9/1981 | Widmer et al. . |
| 4,634,051 | 1/1987 | Dudley ..................................... 239/168 |
| 5,000,385 | 3/1991 | Trusty et al. ............................. 239/168 |
| 5,248,091 | 9/1993 | Thyberg . |

FOREIGN PATENT DOCUMENTS

| | | | |
|---|---|---|---|
| 2038153 | 7/1980 | United Kingdom | ................... 239/168 |

*Primary Examiner*—Patrick Brinson
*Assistant Examiner*—Robin O. Evans
*Attorney, Agent, or Firm*—Maginot, Addison & Moore

[57] ABSTRACT

A crop sprayer includes a number of wheels, a chassis supported by the number of wheels, a boom frame supported by the chassis, and a boom arm segment. The boom arm segment operates in a first mode of operation in which the boom arm segment is maintained at a fixed position relative to the boom frame and a second mode of operation in which the boom arm segment is allowed to freely pivot relative to the boom frame. The crop sprayer further includes an actuator supported on the boom arm segment. The actuator is movable between a pivot-preventing position and a pivot-enabling position. The boom arm segment operates in the first mode of operation when the actuator is positioned in the pivot-preventing position. Movement of the actuator from the pivot-preventing position to the pivot-enabling position causes the boom arm segment to operate in the second mode of operation. A method of preventing damage to a boom arm assembly during a collision between the boom arm assembly and an obstruction is also disclosed.

21 Claims, 7 Drawing Sheets

BOOM ARM SEGMENT RELEASE MECHANISM FOR A CROP SPRAYER

TECHNICAL FIELD OF THE INVENTION

The present invention relates generally to a crop sprayer and more particularly to a boom arm segment release mechanism for a crop sprayer.

BACKGROUND OF THE INVENTION

Crop sprayers are used to distribute a variety of chemicals, such as fertilizers, herbicides, and pesticides in a field where crops are grown. The crop sprayer includes a tractor with a boom arm or pair of boom arms that extend outward from the tractor. A number of nozzles are located along the boom arm. During a spraying operation, the chemicals are advanced through the nozzles as the tractor moves through the field.

In order to increase productivity of the spraying operation, the length of the boom arm is increased so that a greater area of the field can be covered during each pass of the tractor. However, increasing the length of the boom arm correspondingly decreases the maneuverability of the crop sprayer.

As the crop sprayer carries out a spraying operation, the boom arm may come into contact with an obstruction such as a tree, a telephone pole, or a fence post. Typically, the boom arm includes a bend away tip segment that deflects rearwardly as the tip segment of the boom arm comes into contact with the obstruction. The deflection of the bend away tip segment prevents the force of the collision from being transferred to the other parts of the boom arm and the tractor. However, a limitation to using a bend away tip segment is that damage is prevented only in collisions between the bend away tip segment and the obstruction.

The boom arm also includes an inboard boom arm segment secured to the tractor. Collisions between the inboard boom arm segment and the obstruction can potentially cause far more damage to the crop sprayer than collisions between the tip segment and the obstruction. For example, the hydraulic cylinders which are used to raise, lower, and rotate the boom arm are relatively expensive to repair or replace. These hydraulic cylinders are interposed between the tractor and the inboard boom arm segment. When the inboard boom arm segment comes into contact with the obstruction it is likely that one of the hydraulic cylinders will be damaged. The damaged hydraulic cylinder will require expensive repairs or replacement. Furthermore, if the collision occurs at a sufficient speed, the inboard boom arm segment and the associated mounting structure on the tractor may also be damaged. Because the inboard boom arm segment and the mounting structure are large and mechanically complex, replacement of the inboard segment or the associated mounting structure is costly and time consuming.

What is needed therefore is an apparatus and method for preventing damage to the inboard boom arm segment and the associated mounting structure on the tractor during a collision between the inboard boom arm segment and an obstruction.

DISCLOSURE OF THE INVENTION

In accordance with a first embodiment of the present invention, there is provided a crop sprayer which includes a number of wheels, a chassis supported by the number of wheels, a boom frame supported by the chassis, and a boom arm segment. The boom arm segment operates in a first mode of operation in which the boom arm segment is maintained at a fixed position relative to the boom frame, and a second mode of operation in which the boom arm segment is allowed to freely pivot relative to the boom frame. The crop sprayer further includes an actuator supported on the boom arm segment and movable between a pivot-preventing position and a pivot-enabling position. The boom arm segment operates in the first mode of operation when the actuator is positioned in the pivot-preventing position. Movement of the actuator from the pivot-preventing position to the pivot-enabling position causes the boom arm segment to operate in the second mode of operation.

In accordance with a second embodiment of the present invention, there is provided a boom arm assembly. The boom arm assembly includes a boom frame and a boom arm segment. The boom arm segment operates in a first mode of operation in which the boom arm segment is maintained fixed in relation to the boom frame. The boom arm segment further operates in a second mode of operation in which the boom arm segment is allowed to freely pivot relative to the boom frame. The boom arm assembly further includes a number of nozzles supported by the boom arm segment and a conduit supported by the boom arm. The conduit is in fluid communication with each of the number of nozzles. The boom arm assembly still further included an actuator supported by the boom arm segment and movable between a pivot-preventing position and a pivot-enabling position. The boom arm segment operates in the first mode of operation when the actuator is positioned in the pivot-preventing position. Movement of the actuator from the pivot-preventing position to the pivot-enabling position causes the boom arm segment to operate in the second mode of operation.

In accordance with a third embodiment of the present invention, there is provided a method of preventing damage to a boom arm assembly during a collision between the boom arm assembly and an obstruction. The boom arm assembly includes a boom frame, a boom arm segment, and an actuator. The actuator being movable between a pivot-preventing position and a pivot-enabling position. The method includes the steps of biasing the actuator into the pivot-preventing position and operating the boom arm segment in a first mode of operation in which the boom arm segment is fixed in relation to the boom frame during the biasing step. The method further includes the steps of moving the actuator from the pivot-preventing position to the pivot-enabling position in response to the actuator contacting the obstruction and ceasing the first mode operating step and operating the boom arm segment in a second mode of operation in which the boom arm segment is allowed to freely pivot relative to the boom frame in response to performance of the moving step.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
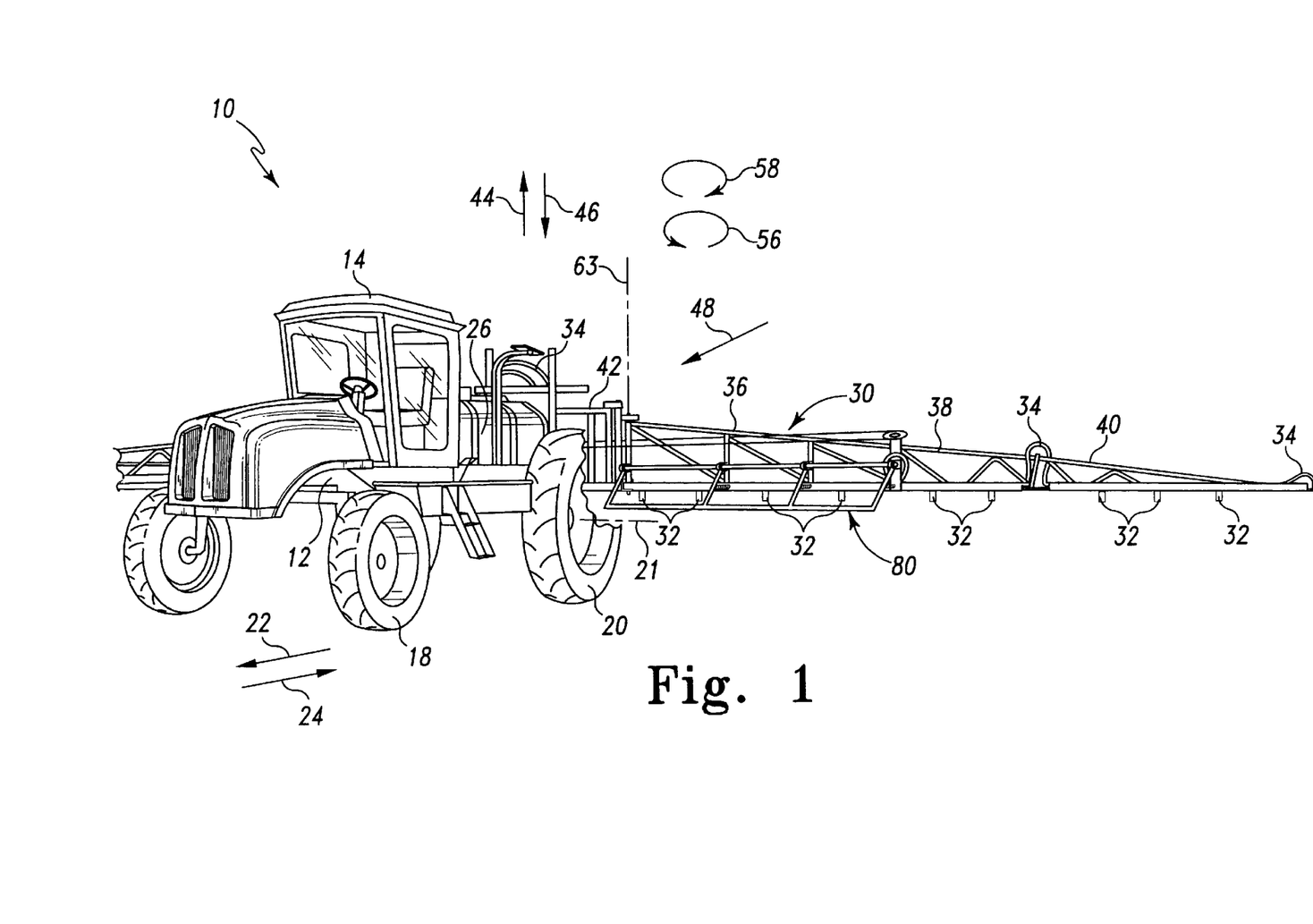
FIG. 1 is a partial perspective view of a crop sprayer which incorporates the features of the present invention therein, note that the right boom arm has been omitted for clarity of description and the inboard boom arm segment is in a first fixed position and operating in a first mode of operation.

Referring now to FIG. 1, there is shown a crop sprayer 10. The crop sprayer 10 includes a chassis 12 that spans most of the length of the crop sprayer 10 and provides a structure for mounting other components of the crop sprayer 10 thereon. The crop sprayer 10 further includes a cab 14 mounted on the chassis 12. The cab 14 houses an operator and a number of controls of the crop sprayer 10.

An engine 16 is mounted on a forward portion of the chassis 12 in front of the cab 14. The engine 16 is a diesel engine which is commercially available from Cummins Engine Co. Inc., of Columbus, Ind. as model 4BT. The chassis 12 is supported by a pair of rear wheels 20 and a pair of front wheels 18. The rear wheels 20 are driven by the engine 16 so as to propel the crop sprayer 10 in the general direction of arrows 22 and 24. In particular, the engine 16 generates mechanical energy which is transferred to the rear wheels 20 by a transmission (not shown), drive shaft (not shown), and rear differential (not shown). The front wheels 18 are operable to steer the crop sprayer 10.

The crop sprayer 10 further includes a storage tank 26 which contains chemicals, such as herbicides, pesticides, and fertilizers to be sprayed on a field. The storage tank 26 is mounted on the chassis 12, aft of the cab 14. The crop sprayer 10 further includes a boom arm assembly 30 which is operable to distribute the chemicals over a wide swath in the field during the spraying operation. In particular, the chemicals are advanced from the storage tank 26 by a pump (not shown) and distributed to a number of nozzles 32 via a conduit 34. The conduit 34 is supported by the boom arm assembly 30 and is in fluid communication with the storage tank 26. The nozzles 32 are spaced along the boom arm assembly 30 so that the chemicals are distributed over a wide area as the crop sprayer 10 is propelled in the general direction of arrows 22 and 24.

The boom arm assembly 30 includes an inboard boom arm segment 36, a center boom arm segment 38 and a tip boom arm segment 40. The inboard boom arm segment 36 is pivotably secured to a boom frame 42 which is, in turn, secured to the chassis 12. The inboard boom arm segment 36 is shown in the first mode of operation in FIG. 1. In the first mode of operation, the inboard boom arm segment 36 is maintained in a fixed position relative to the boom frame 42. In FIG. 1, the inboard boom arm segment 36 is shown in a first fixed position which is substantially parallel to a transverse line 21 defined by the axis of rotation of the rear wheel 20.

The boom frame 42 is slidingly secured to the the chassis 12 such that when hydraulic pressure is applied to a lift cylinder (not shown), the boom frame 42 is advanced in the general direction of arrow 44. Similarly, when hydraulic pressure is removed from the lift cylinder, the boom frame 42 advances in the general direction of arrow 46.

Figure 2:
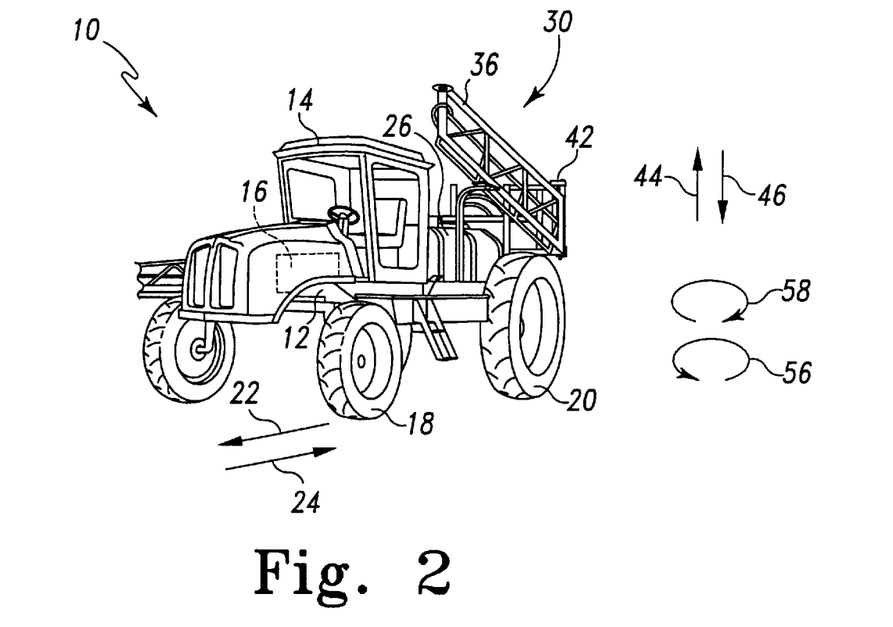
FIG. 2 is a reduced view which is somewhat similar to FIG. 1, but showing the inboard boom arm segment in a second fixed position and operating in the first mode of operation, note that the central boom arm segment and tip boom arm segment are not shown for clarity of description.

Referring now to FIG. 2, there is shown the inboard boom arm segment 36 positioned in a second fixed position. The inboard boom arm segment 36 is positioned in the second fixed position when it is desired to stow the boom arm assembly 30 during transportation to or from the field where the spraying operation is performed. Note, in the second fixed position, the boom frame 42 is raised in the general direction of arrow 44 and the inboard boom arm segment 36 is rotated in the general direction of arrow 58 to position the inboard boom arm segment 36 adjacent to the cab 14. Also, note that the center boom segment 38 and the tip boom segment 40 are not shown in FIG. 2 for clarity of description.

Figure 3:
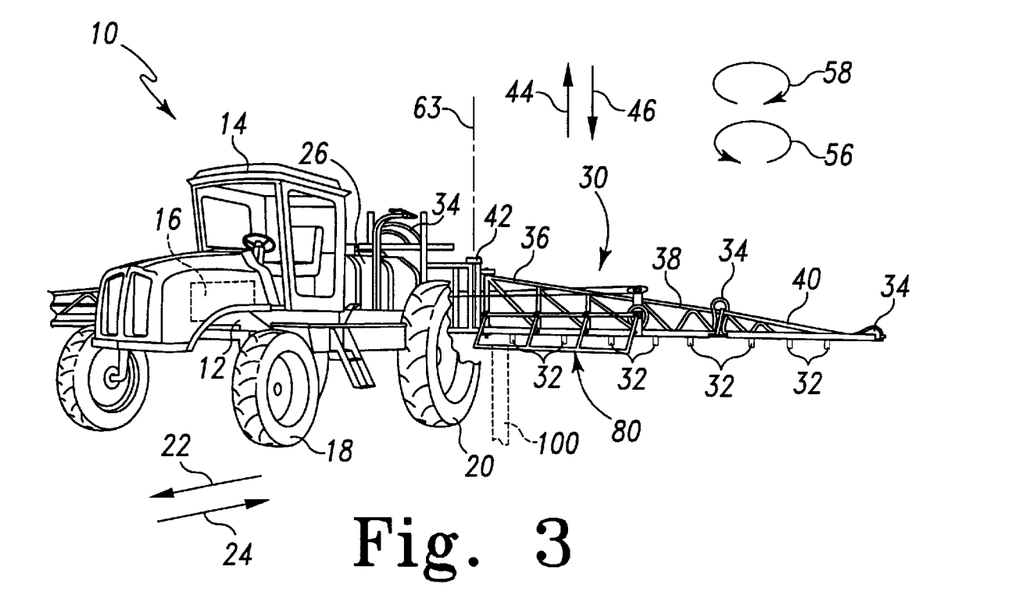
FIG. 3 is a view similar to FIG. 1, but showing the inboard boom arm segment operating in a second mode of operation.

Referring now to FIG. 3, there is shown the inboard boom arm segment 36 in the second mode of operation. In the second mode of operation, the inboard boom arm segment 36 may freely pivot about an axis 63 relative to the boom arm frame 42 in the general direction of arrows 56 and 58. What is meant herein by the term "freely pivot" is that structure of the boom arm assembly 30 and/or the boom frame 42 does not oppose the rotation of the inboard boom arm segment 36 relative to the boom frame 42 in the general direction of arrows 56 or 58. Enabling the inboard boom arm segment 36 to freely pivot about the axis 63 during certain periods of time has the significant advantage of allowing the inboard boom arm segment 36 to swing rearwardly in the general direction of arrow 56 when the inboard boom arm segment 36 comes into contact with an obstruction 100 as the crop sprayer 10 is advancing in the general direction of arrow 22. By allowing the inboard boom arm segment 36 to rotate relative to the boom frame 42 in the general direction of arrow 56, the inboard boom arm segment 36 does not absorb the full energy of a collision with the obstruction 100. Additionally, a lesser amount of the energy of collision is transferred to the boom arm frame 42 and other components of the crop sprayer 10.

Figure 4:
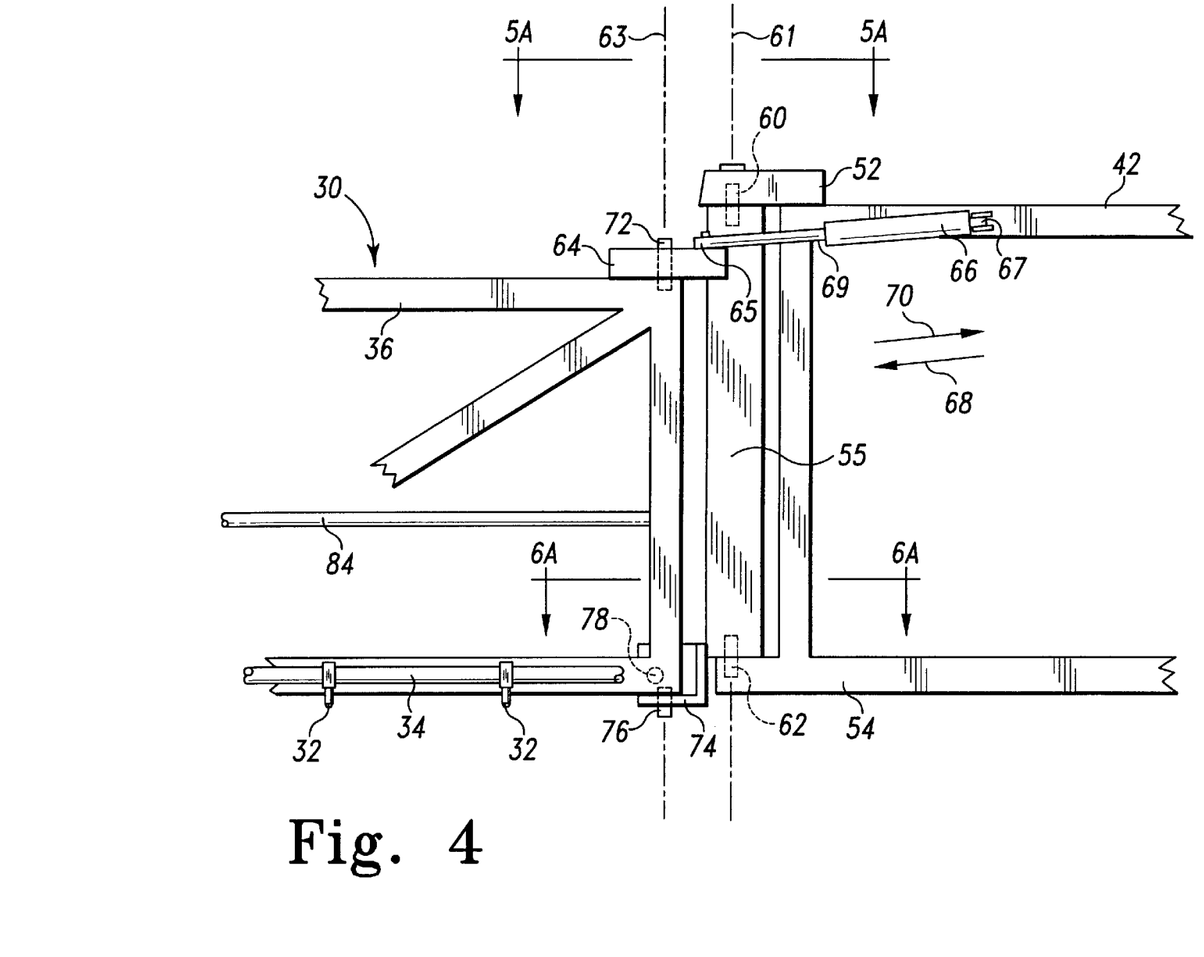
FIG. 4 is a rear elevational view of a portion of the inboard boom arm segment and a portion of the boom frame of the crop sprayer of FIG. 1.

Referring now to FIG. 4, there is shown a fragmentary rear view of the crop sprayer 10, as viewed in the direction of arrow 48 of FIG. 1. The boom frame 42 includes an upper support 52 and a lower support 54. A pivot member 55 is pivotally secured to the upper support 52 and the lower support 54 by a respective pin 60 or 62. The pivot member 55 is free to rotate relative to the boom frame 42 in the general direction of arrows 56 and 58 about an axis 61.

Figure 5A:
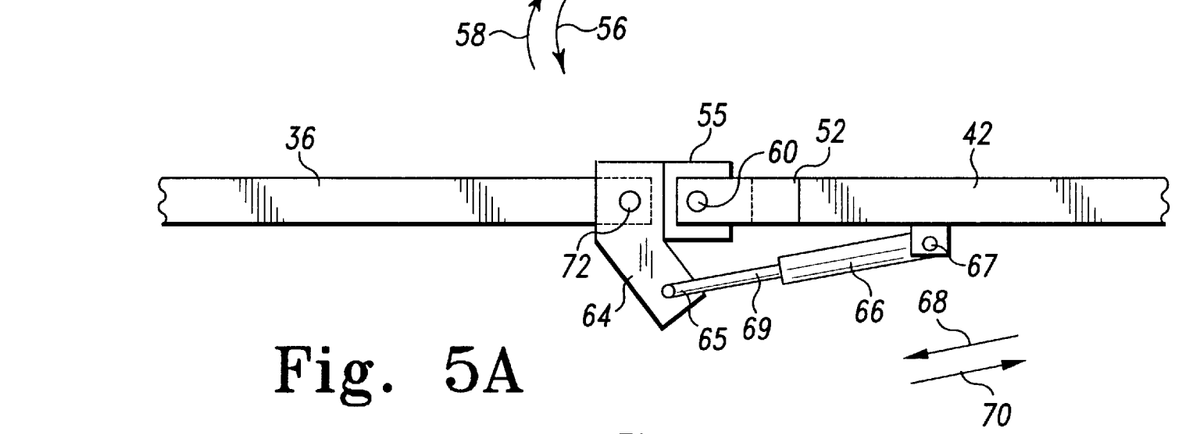
FIG. 5A is a fragmentary top elevational view of an upper portion of the boom frame and a portion of the inboard boom arm segment operating in the first mode of operation taken along line 5A—5A of FIG. 4, as viewed in the direction of the arrows, note that the actuator and second boom link are not shown for clarity of description.
Figure 5B:
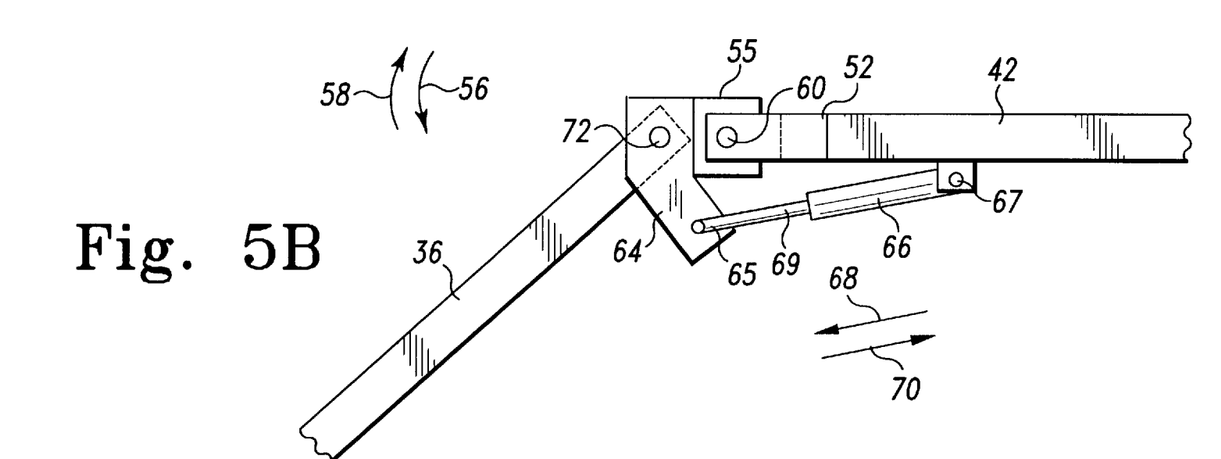
FIG. 5B is a view similar to FIG. 5A, but showing the inboard boom arm segment operating in the second mode of operation.

Referring now to FIGS. 4 and 5A, a first boom link 64 is secured to an upper portion of the pivot member 55. The inboard boom arm segment 36 is pivotally coupled to the first boom link 64 by a pin 72 such that the first boom link 64 is free to rotate relative to boom frame 42 in the general direction of arrows 56 and 58 about an axis 63. Furthermore, a first end 65 of a fluid cylinder 66 is mechanically coupled to the first boom link 64, and a second end 67 is coupled to the boom frame 42. When the rod 69 of the cylinder 66 is retracted in the general direction of arrow 70 to the first rod position (shown in FIG. 5A), the cylinder 66 acts on the first boom link 64 so as to rotate the first boom link 64 and the pivot member 55 in the general direction of arrow 56. Similarly, when a rod 69 of the cylinder 66 is extended in the general direction of arrow 68 to the second rod position (not shown), the cylinder 66 acts on the first boom link 64 so as to rotate the first boom link 64 and hence the pivot member 55 in the general direction of arrow 58.

Figure 6A:
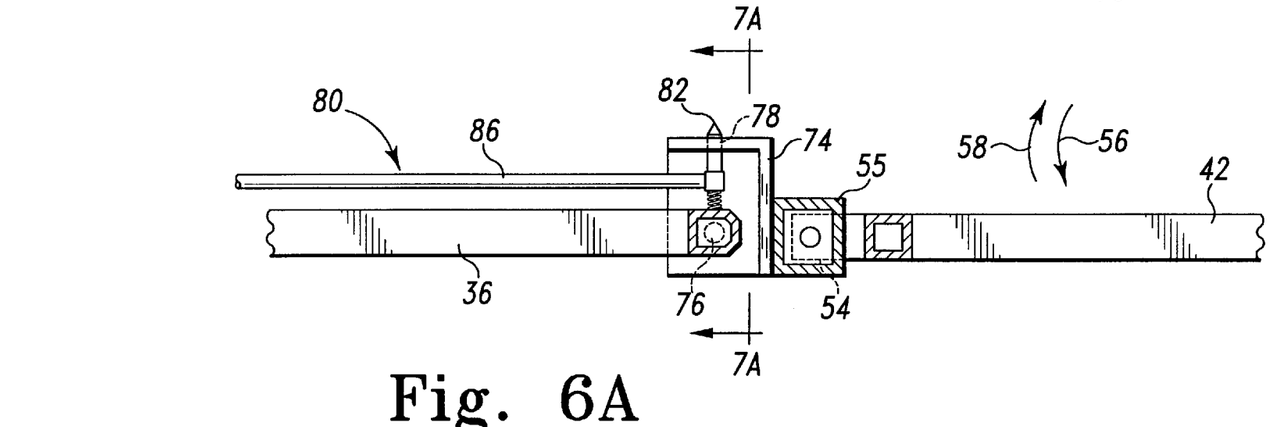
FIG. 6A is a framentary top elevational view of a lower portion of the frame and the boom arm operating in the first mode of operation taken along line 6A—6A of FIG. 4, as viewed in the direction of the arrows.

Referring now to FIGS. 4 and 6A, a second boom link 74 is secured to a lower portion of the pivot member 55. The second boom link 74 is pivotally coupled to the boom frame 42 by a pin 76 such that the second boom link 74 is free to rotate relative to the boom frame 42 in the general direction of arrows 56 and 58 about an axis 63. When the cylinder 66 is extended in the general direction of arrow 68, the cylinder 66 acts on the first boom link 64 so as to rotate the first boom link 64, the pivot member 55, and second boom link 74 in the general direction of arrow 58. Similarly, when the cylinder 66 is retracted in the general direction of arrow 70, the cylinder 66 acts on the first boom link 64 so as to rotate the first boom link 64, pivot member 55, and second boom link 74 in the general direction of arrow 56.

In addition, the second boom link 74 can be selectively coupled to the inboard boom arm segment 36. In particular, a pin member 82 of an actuator 80 rigidly couples the inboard boom arm segment 36 to the second boom link 74 when the pin member 82 of the actuator 80 is positioned in a first pin position. In the first pin position, the pin member 82 extends through a hole 78 defined in the second boom link 74. This places the actuator 80 in a pivot-preventing position which places the inboard boom arm segment 36 in the first mode of operation.

In the first mode of operation, the inboard boom arm segment 36 cannot freely pivot relative to the second boom link 74 about the axis 63. The position of the inboard boom arm segment 36 relative to the boom frame 42 is fixed by the position of the rod 69 which rotates the first boom link 64, the pivot member 55, the second boom link 74, and the inboard boom arm segment 36 about the axis 61. It should be appreciated that when the rod 69 is in the first rod position and the actuator 80 is in the pivot-preventing position, retracting the rod in the direction of arrow 70 (as shown in FIG. 5A) places the inboard boom arm segment 36 in the first fixed position shown in FIG. 1. It should further be appreciated that when the rod 69 is extended in the direction of arrow 68 to the second rod position (not shown) and the inboard boom segment 36 is in the pivot-preventing position, the inboard boom arm segment 36 is positioned in the second fixed position shown in FIG. 2.

Figure 6B:
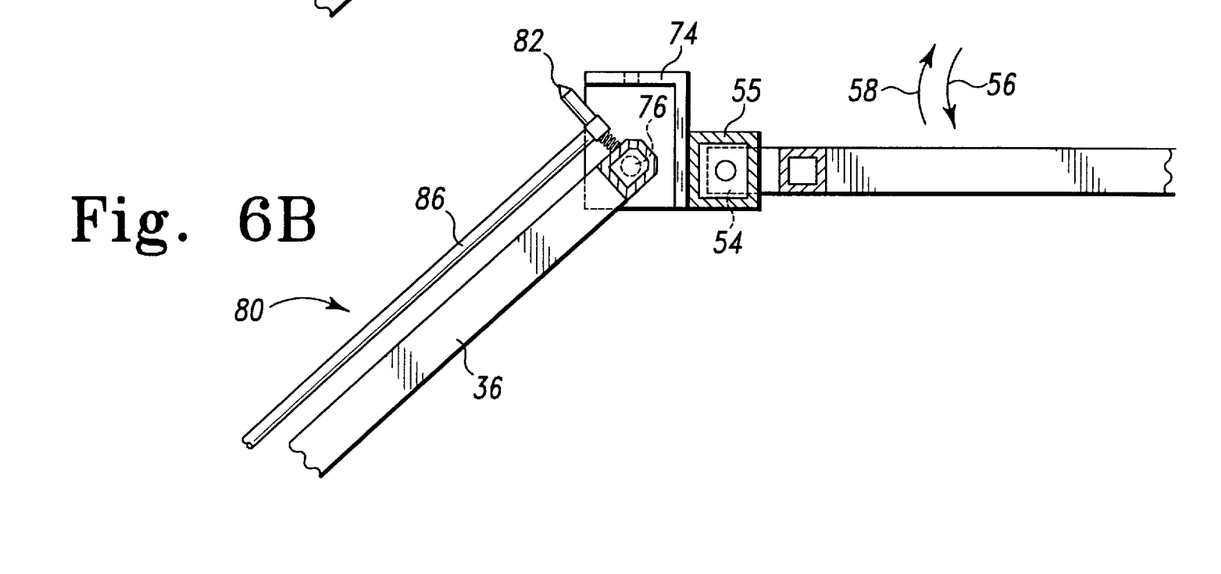
FIG. 6B is a view similar to FIG. 6A, but showing the inboard boom arm segment operating in the second mode of operation.

Referring now to FIG. 6B, the pin member 82 of the actuator 80 is in a second pin position whereby the pin member 82 is spaced apart from the hole 78 of the second boom link 74. When the pin member 82 is in the second pin position, the actuator 80 is in a pivot-enabling position. In the pivot-enabling position, the inboard boom arm segment 36 is able to freely pivot about pin 76 relative to the second boom link 74 and to freely pivot about the pin 72 relative to the first boom 64. Thus, when the pin member 82 is in the second pin position, the inboard boom arm segment 36 can freely pivot about the axis 63. Therefore, the inboard boom arm segment 36 is placed in the second mode of operation when the pin member 82 is moved from the first pin position to the second pin position. It should be appreciated that when actuator 80 is in the pivot-enabling position, retracting or extending the rod 69 does not cause the inboard boom arm segment 36 to rotate about the axis 63.

Figure 7A:
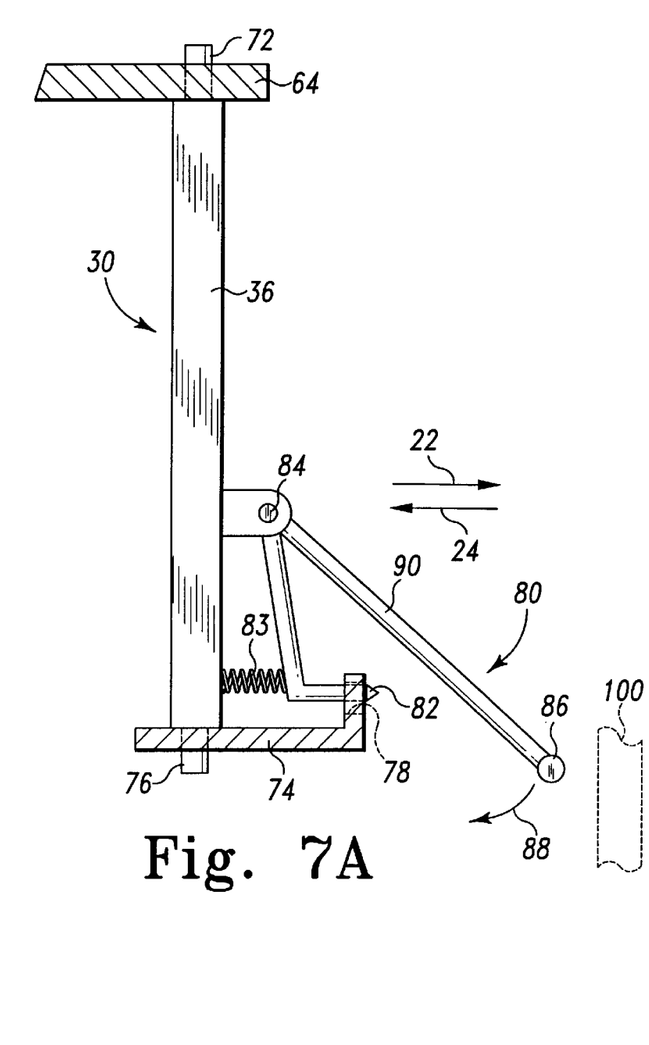
FIG. 7A is a side elevational view of the lower portion of the frame and boom arm of FIG. 6A taken along line 7A—7A of FIG. 6A, as viewed in the direction of the arrows, note that the actuator is in the pivot-preventing position.
Figure 7B:
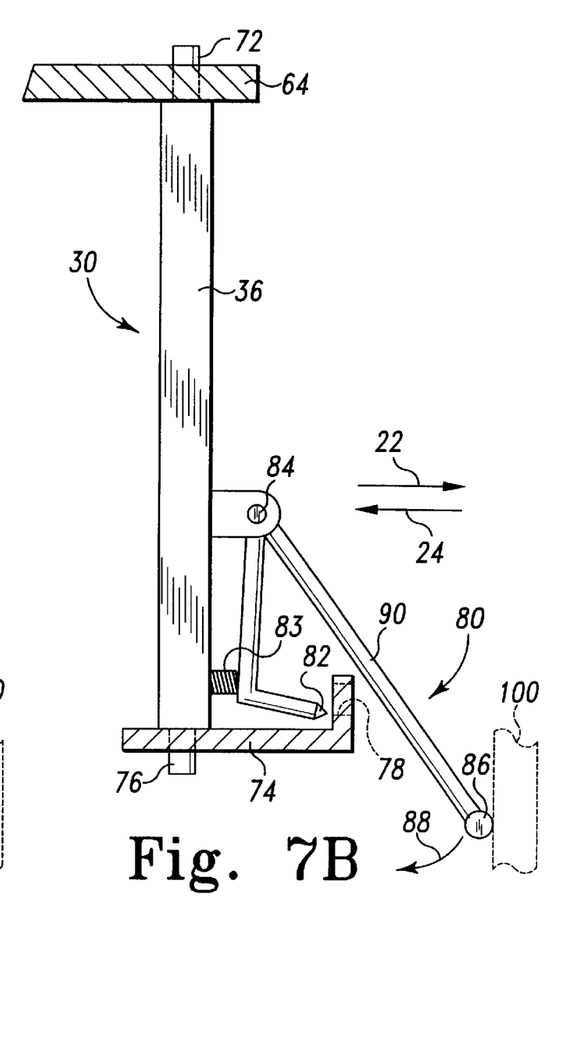
FIG. 7B is a view similar to FIG. 7A, but showing the actuator in the pivot-enabling position.

Referring to FIGS. 7A and 7B, there is shown the actuator 80 in greater detail. The pin member 82 of the actuator 80 is secured to an axle 84 which is rotatably supported by the inboard boom arm segment 36. A bumper 86 is also secured to the axle 84 with a bumper arm 90, such that rotation of the bumper 86 in the general direction of arrow 88 causes the axle 84 and pin member 82 to also rotate in the general direction of arrow 88. Thus, when the crop sprayer 10 and boom arm assembly 30 are advancing in the general direction of arrow 22, and the bumper 86 comes into contact with the obstruction 100, the bumper 86 will be forced in the general direction of arrow 24, which will cause the bumper 86 to rotate relative to the inboard boom arm segment 36 in the general direction of arrow 88. Rotation of the bumper in the general direction of arrow 88 will cause the shaft 84 and the pin member 82 to rotate in the general direction of arrow 88 which will space the pin member 82 apart from the hole 78 of the second boom link 74 as shown in FIG. 7B. It should be appreciated that when the pin member 82 is moved from the first pin position where the pin member extends through the hole 78 to the second pin position where the pin member 82 is spaced apart from the hole 78, the inboard boom arm segment 36 is moved from the first mode of operation to the second mode of operation, as described above.

The actuator 80 further includes a spring 83 interposed between the pin member 82 and the inboard boom arm segment 36. The spring 83 serves two purposes. First, the spring 83 biases the pin member 82 in the direction of arrow 22 which biases the pin member 82 into the first pin position thereby maintaining the inboard boom arm segment 36 in the first mode of operation. Second, the spring 83 absorbs some of the energy transferred to the inboard boom arm segment 36 when the bumper 86 comes into contact with the obstruction 100 and the pin member 82 rotates in the general direction of arrow 88 thereby compressing the spring 83.

Figure 8:
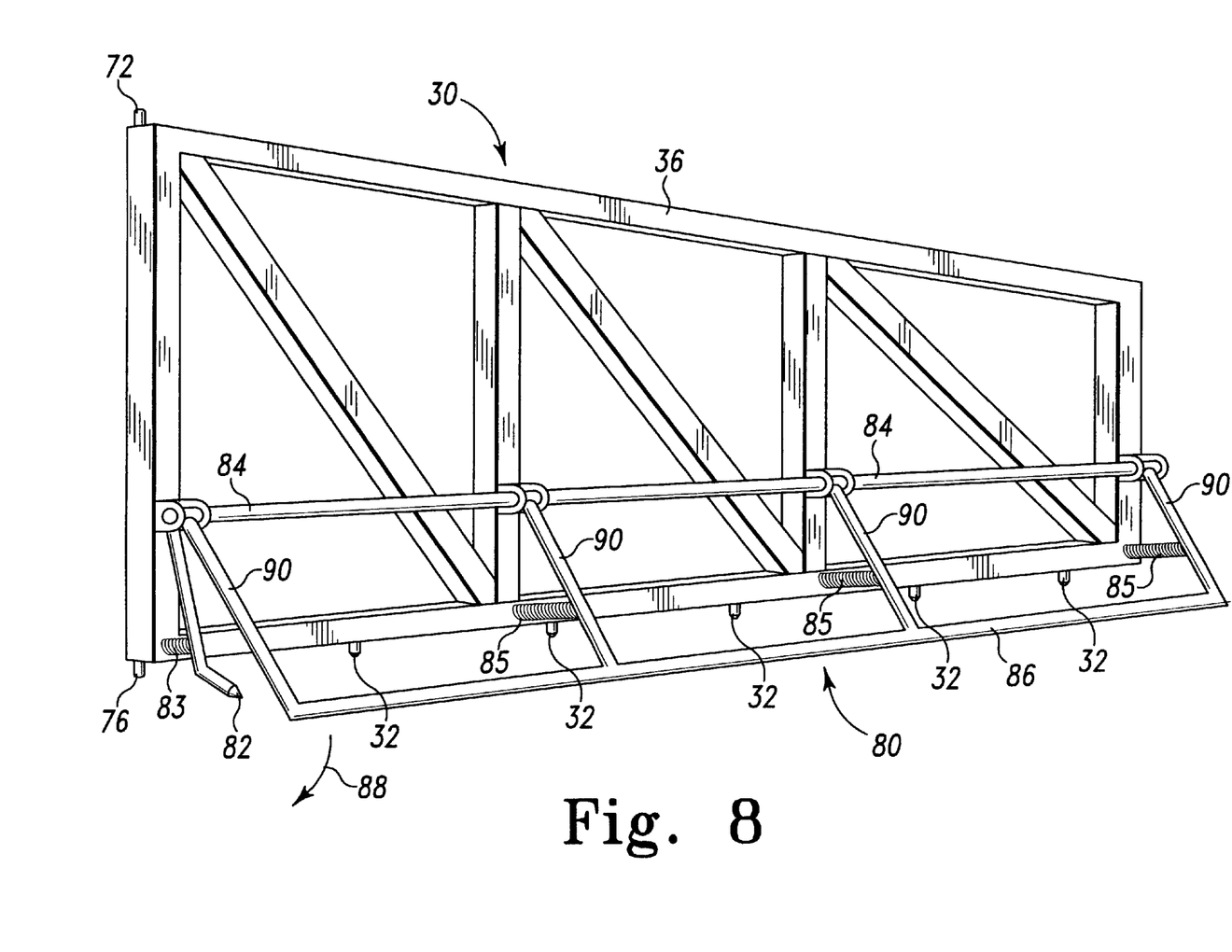
FIG. 8 is a persepective view of the inboard boom arm segment of the crop sprayer of FIG. 1 showing the attached actuator.

Referring now to FIG. 8, there is shown the inboard boom arm segment 36 and the attached actuator 80. It should be noted that the bumper 86 and axle 84 span the length of the inboard boom arm segment 36. The bumper 86 is connected to the axle 84 by four bumper arms 90. In addition, a spring 85 is interposed between each of the bumper arms 90, except the bumper arm 90 proximate to the pin member 82. Each of the springs 85 performs two functions similar to the spring 83. First, each of the springs 85 biases the pin member 82 into the first pin position which maintains the inboard boom arm segment 36 in the first mode of operation. Second, each of the springs 85 absorbs some of the energy transferred to the inboard boom arm segment 36 when the bumper 86 comes into contact with the obstruction 100. It should be appreciated that this arrangement positions the bumper 86 to come into contact with the obstruction 100 prior to the obstruction 100 contacting the inboard boom arm segment 36 as the crop sprayer 10 is advanced in the general direction of arrow 22. This contact will force the bumper 86 in the general direction of arrow 24, which will cause the shaft 84 and pin member 82 to rotate in the general direction of arrow 88. As the pin member 82 moves in the general direction of arrow 88 the inboard boom arm segment 36 moves from the first mode of operation to the second mode of operation, as described above.

Industrial Applicability

The spraying operation of the crop sprayer 10 begins by positioning the boom arm assembly 30 in the position shown in FIG. 1 which places the inboard boom arm segment 36 in the first fixed position relative to the boom frame 42. To maintain the inboard boom arm segment 36 in the first fixed in relation to the first boom link 62, the pin member 82 is positioned in the first pin position in which the pin member 82 extends through the hole 78 defined in the second boom link 84, as shown in FIG. 6B. The spring 83 biases the pin member 82 into the first pin position, which holds the actuator 80 in the pivot-preventing position. Placing the actuator in the pivot-preventing position places the inboard boom arm segment 36 in the first mode of operation. In the first mode of operation, the inboard boom arm segment 36 is maintained in a fixed position relative to the first boom link 64 and the second boom link 74, and cannot be rotated about the axis 63 in the general direction of arrows 56 and 58.

During the spraying operation, the crop sprayer 10 is advanced in the general direction of arrow 22. As the crop sprayer 10 is advanced, chemicals such as herbicides, pesticides or fertilizer are advanced from the tank 26 to the nozzles 32 spaced along the boom arm assembly 30. During advancement of the crop sprayer 10, the inboard boom arm segment 36 may come into contact with an obstruction 100 shown in FIG. 3.

When the bumper 86 of the actuator 80 comes into contact with the obstruction 100, the bumper 86 is moved relative to the inboard boom arm segment 36 thereby causing the axle 84 and pin member 82 to rotate in the general direction of arrow 88 as shown in FIGS. 7A and 7B. As the pin member 82 moves in the general direction of arrow 88, the pin member 82 becomes spaced apart from the hole 78 defined in the second boom link 74. As the pin member 82 is being spaced from the hole 78, the actuator 80 moves from the pivot-preventing position (shown in FIGS. 6A and 7A) to the pivot-enabling position (shown in FIGS. 6B and 7B). As the actuator 80 is moved from the pivot-preventing position to the pivot-enabling position, the inboard boom arm segment 36 ceases to operate in the first mode of operation and begins operating in the second mode of operation. In the second mode of operation, the inboard boom arm segment 36 is allowed to freely pivot relative to the first boom link 64 and second boom link 74 about the axis 63.

Enabling the inboard boom arm segment 36 to freely pivot about the axis 63 has the significant advantage of allowing the inboard boom arm segment 36 to swing rearwardly in the general direction of arrow 56 when the inboard boom arm segment 36 comes into contact the obstruction 100 as the crop sprayer 10 is advancing in the general direction of arrow 22. By allowing the boom arm segment 36 to rotate in the general direction of arrow 56, the inboard boom arm segment 36 does not absorb the full amount of the energy generated as the inboard boom arm segment 36 collides or otherwise comes into contact with the obstruction 100. Additionally, a lesser amount of the energy of collision is transferred to the boom arm frame 42 and other components of the crop sprayer 10 during such collisions between the inboard boom arm segment 36 and the obstacle 100.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although present invention is herein described as protecting the inboard boom arm segment 36, and has significant advantages thereby in the present invention, the present invention could also be applied to protect the central boom arm segment 38 by allowing the central boom arm segment 38 to pivot freely relative to the inboard boom arm segment 36 when the central boom arm segment 38 collides with the obstruction 100 in a manner similar to that described above with regard to the inboard boom arm segment 36 freely pivoting relative to the boom frame 42.

Moreover, the present invention could be applied to protect the tip boom arm segment 40 by allowing the tip boom arm segment 40 to pivot freely relative to the central boom arm segment 38 when the tip boom arm segment 40 collides with the obstruction 100 in a manner similar to that described above with regard to the inboard boom arm segment 36 freely pivoting relative to the boom frame 42.

In addition, the present invention could be applied to protect any two or all three of the boom arm segments 36, 38, 40 simultaneously.

What is claimed is:

1. A crop sprayer, comprising:
   a number of wheels;
   a chassis supported by said number of wheels;
   a boom frame supported by said chassis;
   a boom arm segment which operates in (i) a first mode of operation in which said boom arm segment is maintained fixed in relation to said boom frame, and (ii) a second mode of operation in which said boom arm segment is allowed to freely pivot relative to said boom frame; and
   an actuator supported by said boom arm segment and movable between a pivot-preventing position and a pivot-enabling position, wherein (i) said boom arm segment operates in said first mode of operation when said actuator is positioned in said pivot-preventing position, and (ii) movement of said actuator from said pivot-preventing position to said pivot-enabling position causes said boom arm segment to operate in said second mode of operation,
   wherein said actuator includes a bumper assembly having (i) a bumper rod, (ii) an axle rod which is spaced apart from said bumper rod, and (iii) a plurality of bumper arms spaced apart from each other and extending between said bumper rod and said axle rod, and
   wherein said actuator further includes a plurality of springs, each being interposed between said bumper assembly and said boom arm segment, whereby energy is absorbed by said plurality of springs when said bumper assembly is advanced into contact with an obstruction.

2. The crop sprayer of claim 1, further comprising a fluid cylinder having a first end and a second end, wherein:
   said first end of said fluid cylinder is mechanically coupled to said boom frame,
   said second end of said fluid cylinder is mechanically coupled to said boom arm segment, said fluid cylinder is positionable between a first rod position and a second rod position, said boom arm segment is maintained at a first fixed position relative to said boom frame when (i) said fluid cylinder is positioned at said first rod position, and (ii) said boom arm segment is operating in said first mode of operation, and said boom arm segment is maintained at a second fixed position relative to said boom frame when (i) said fluid cylinder is positioned at said second rod position, and (ii) said boom arm segment is operating in said first mode of operation.

3. The crop sprayer of claim 2, further comprising a cab supported by said chassis, wherein:

a transverse line is defined by a center axis of a rear wheel of said number of wheels, said boom arm segment extends away from said chassis so as to be oriented substantially parallel to said transverse line when said boom arm segment is maintained at said first fixed position, and said boom arm segment is stowed adjacent said cab when said boom arm segment is maintained at said second fixed position.

4. The crop sprayer of claim 1, further comprising a first boom link secured to said boom arm segment, wherein:

said boom arm segment is maintained at a fixed position relative to said first boom link when said boom arm segment is operating in said first mode of operation, and said boom arm segment is allowed to freely pivot relative to said first boom link when said boom arm segment is operating in said second mode of operation.

5. The crop sprayer of claim 4, further comprising a fluid cylinder having a first end and a second end, wherein:

said first end of said fluid cylinder is mechanically coupled to said first boom link, said second end of said fluid cylinder is mechanically coupled to said boom frame, said fluid cylinder is positionable between a first rod position and a second rod position, said first boom link is pivotably coupled to said boom frame, said first boom link is maintained at a first fixed position relative to said boom frame when said fluid cylinder is positioned at said first rod position, and said first boom link is maintained at a second fixed position relative to said boom frame when said fluid cylinder is positioned at said second rod position.

6. The crop sprayer of claim 1, further comprising a second boom link pivotably coupled to said boom frame and having a hole defined therein, wherein:

said actuator includes a pin member, said pin member is movable between a first pin position and a second pin position, said pin member is positioned in said first pin position when said actuator is positioned in said pivot-preventing position, said pin member is positioned in said second pin position when said actuator is positioned in said pivot-enabling position, said pin member extends through said hole of said second boom link when (i) said pin member is positioned in said first pin position, and (ii) said boom arm segment is operating in said first mode of operation, and said pin member is spaced apart from said second boom link when (i) said pin member is positioned in said second pin position, and (ii) said boom arm segment is operating in said second mode of operation.

7. The crop sprayer of claim 6, wherein: said plurality of springs bias said pin member into said first pin position.

8. The crop sprayer of claim 1, wherein:

said axle rod is positioned in a parallel relationship to said bumper rod, and each of said plurality of bumper arms is positioned in a parallel relationship with each other.

9. The crop sprayer of claim 1, further comprising:

a tank supported by said chassis for storing chemicals therein;

a number of nozzles supported by said boom arm segment; and a conduit which places said tank in fluid communication with each of said number of nozzles.

10. The crop sprayer of claim 1, wherein:

said axle rod is rotatably mounted to said boom arm segment, movement of said bumper assembly against the spring bias of said plurality of springs causes rotation of said axle rod, and rotation of said axle rod causes said boom arm segment to operate in said second mode of operation.

11. The crop sprayer of claim 1, wherein each of said plurality of springs is interposed between one of said bumper arms and said boom arm segment.

12. A boom arm assembly, comprising:

a boom frame;

a boom arm segment which operates in (i) a first mode of operation in which said boom arm segment is maintained fixed in relation to said boom frame, and (ii) a second mode of operation in which said boom arm segment is allowed to freely pivot relative to said boom frame;

a number of nozzles supported by said boom arm segment;

a conduit supported by said boom arm, said conduit being in fluid communication with each of said number of nozzles; and an actuator supported by said boom arm segment and movable between a pivot-preventing position and a pivot-enabling position, wherein (i) said boom arm segment operates in said first mode of operation when said actuator is positioned in said pivot-preventing position, and (ii) movement of said actuator from said pivot-preventing position to said pivot-enabling position causes said boom arm segment to operate in said second mode of operation, wherein said actuator includes a bumper assembly having (i) a bumper rod, (ii) an axle rod which is spaced apart from said bumper rod, and (iii) a plurality of bumper arms spaced apart from each other and extending between said bumper rod and said axle rod, and wherein said actuator further includes a plurality of springs, each being interposed between said bumper assembly and said boom arm segment, whereby energy is absorbed by said plurality of springs when said bumper assembly is advanced into contact with an obstruction.

13. The boom arm assembly of claim 12, further comprising a first boom link secured to said boom arm segment, wherein:

said boom arm segment is maintained at a fixed position relative to said first boom link when said boom arm segment is operating in said first mode of operation, and said boom arm segment is allowed to freely pivot relative to said first boom link when said boom arm segment is operating in said second mode of operation.

14. The boom arm assembly of claim 13, further comprising a fluid cylinder having a first end and a second end, wherein:

said first end of said fluid cylinder is mechanically coupled to said first boom link, said second end of said fluid cylinder is mechanically coupled to said boom frame, said fluid cylinder is positionable between a first rod position and a second rod position, said first boom link is pivotably coupled to said boom frame, said first boom link is maintained at a first fixed position relative to said boom frame when said fluid cylinder is positioned at said first rod position, and said first boom link is maintained at a second fixed position relative to said boom frame when said fluid cylinder is positioned at said second rod position.

15. The boom arm assembly of claim 12, further comprising a second boom link pivotably coupled to said boom frame and having a hole defined therein, wherein:

said actuator includes a pin member, said pin member is movable between a first pin position and a second pin position, said pin member is positioned in said first pin position when said actuator is positioned in said pivot-preventing position, said pin member is positioned in said second pin position when said actuator is positioned in said pivot-enabling position, said pin member extends through said hole of said second boom link when (i) said pin member is positioned in said first pin position, and (ii) said boom arm segment is operating in said first mode of operation, and said pin member is spaced apart from said second boom link when (i) said pin member is positioned in said second pin position, and (ii) said boom arm segment is operating in said second mode of operation.

16. The boom arm assembly of claim 15, wherein: said plurality of springs bias said pin member into said first pin position.

17. The boom arm assembly of claim 12, further comprising a fluid cylinder having a first end and a second end, wherein:

said first end of said fluid cylinder is mechanically coupled to said boom frame, said second end of said fluid cylinder is mechanically coupled to said boom arm segment, said fluid cylinder is positionable between a first rod position and a second rod position, said boom arm segment is maintained at first fixed position relative to said boom frame when (i) said fluid cylinder is positioned at said first rod position, and (ii) said boom arm segment is operating in said first mode of operation, and said boom arm segment is maintained at a second fixed position relative to said boom frame when (i) said fluid cylinder is positioned at said second rod position, and (ii) said boom arm segment is operating in said first mode of operation.

18. The boom arm assembly of claim 17, wherein:

said boom arm segment extends in a first direction when said boom arm segment is maintained at said first fixed position, said boom arm segment extends in a second direction when said boom arm segment is maintained at said second fixed position, and said second direction is substantially perpendicular to said first direction.

19. The crop sprayer of claim 12, wherein:

said axle rod is rotatably mounted to said boom arm segment, movement of said bumper assembly against the spring bias of said plurality of springs causes rotation of said rod, and rotation of said axle rod causes said boom arm segment to operate in said second mode of operation.

20. The crop sprayer of claim 12, wherein each of said plurality of springs is interposed between one of said bumper arms and said boom arm segment.

21. The crop sprayer of claim 12, wherein:

said axle rod is positioned in a parallel relationship to said bumper rod, and each of said plurality of bumper arms is positioned in a parallel relationship with each other.

* * * * *